May 16, 1950     H. F. MINNIS     2,507,804
LUBRICANT SEAL
Filed July 21, 1947
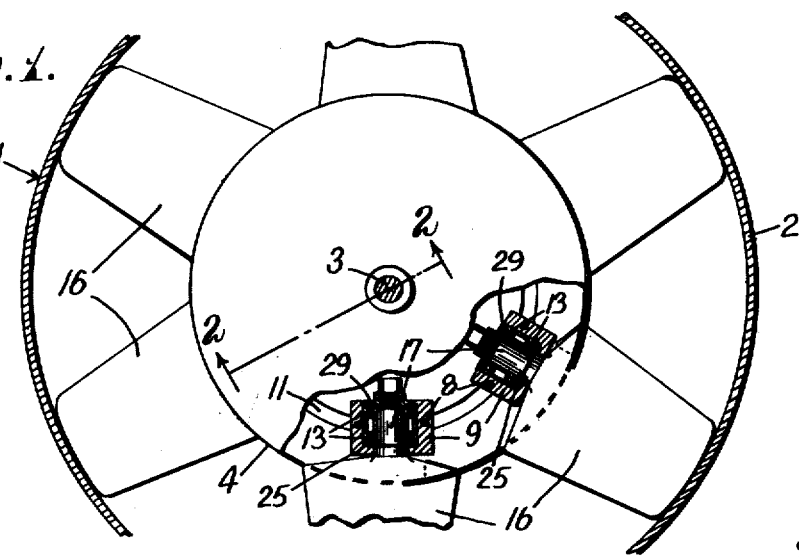
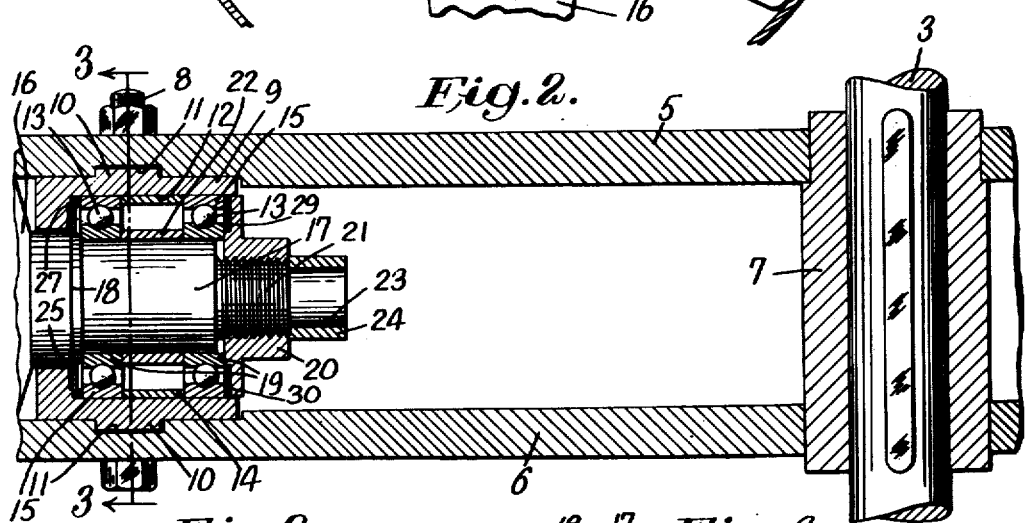
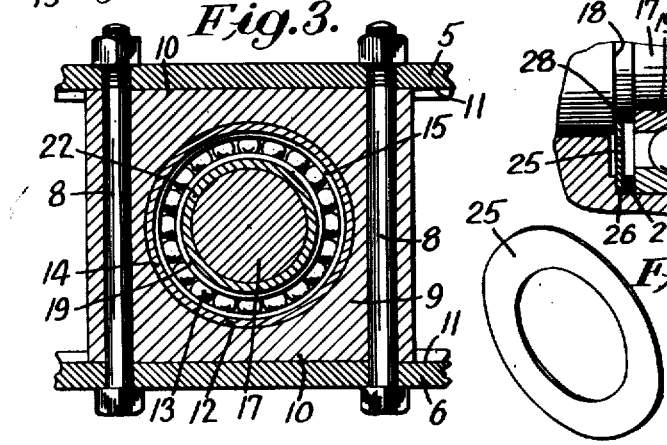
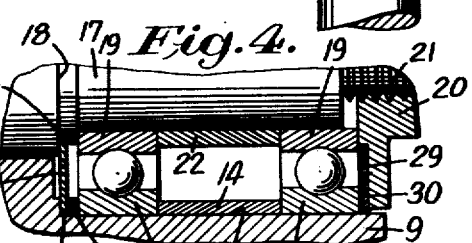
Inventor:
Harold F. Minnis
by Charles F. Osgood,
atty.

Patented May 16, 1950

2,507,804

UNITED STATES PATENT OFFICE 2,507,804

LUBRICANT SEAL

Harold F. Minnis, New Philadelphia, Ohio, assignor to Joy Manufacturing Company, a corporation of Pennsylvania Application July 21, 1947, Serial No. 762,321

6 Claims. (Cl. 308—187.1)

This invention relates to lubricant seals and more particularly to a lubricant seal for the bearings of a rotating mechanism, such as a variable pitch fan, for preventing leakage of lubricant from the bearings along the rotatable members, such as the fan blade shanks, journaled in the bearings.

In a rotating mechanism which carries bearings for radially disposed members, in which the latter are journaled to turn about radial axes disposed at substantially right angles to the axis of rotation of the mechanism, difficulty has been experienced in preventing leakage of lubricant from the bearings due to centrifugal action on the lubricant as the mechanism rapidly revolves. This is particularly true in a variable pitch fan having a revoluble hub carrying radially located bearings, in which the shanks of the variable pitch blades of the fan are journaled. In such fans, the propeller blades have their shanks journaled in the radially located bearings carried by the fan hub, with the blades arranged to turn to vary the pitch adjustment on radial axes at substantially right angles to the hub axis, and due to the location of the bearings, lubricant tends to be forced out from the bearings under the action of centrifugal force as the fan revolves. Known attempts have been made to maintain adequate lubricant seals for such rotatable mechanisms, but such known seals are inadequate or result in excessive friction between the relatively rotatable parts, substantially reducing operating efficiency.

The present invention contemplates improvements over known sealing devices in that an effective seal for the bearings of the rotatable members is provided wherein centrifugal force, as a result of rapid rotation of the mechanism, tends to provide a sealing pressure which increases as the centrifugal force increases due to increased rotation, while maintaining friction between the relatively rotatable parts at a minimum as compared to known types of seals. The invention, from one aspect, may comprise a sealing washer secured to one of the relatively rotatable parts and frictionally engaging the other so that as the rotating mechanism rapidly revolves, the centrifugal action on the lubricant creates a pressure on the sealing washer to hold the latter in tight sealing contact with the part with which the washer engages. From a more specific aspect, the invention may comprise a revoluble casing, such as a fan hub, carrying a radially located bearing for a rotatable member, such as a variable pitch fan blade, journaled in the bearing, with its axis of rotation at substantially right angles to the axis of the revoluble casing and having a flexible sealing washer secured to the casing and frictionally engaging a radial annular shoulder on the rotatable member and so arranged that lubricant in the casing acts on the washer as a result of centrifugal force to hold the washer in tight sealing contact with the shoulder to prevent leakage of lubricant from the bearings. The rotating mechanism, as stated above, may assume the form of a variable pitch fan wherein the revolving fan hub carries radially located bearings in which the shanks of the variable pitch blades are journaled and the sealing means above outlined may be arranged between the casing of the fan hub and shoulders on the fan blade shanks.

It is an object of the present invention to provide an improved lubricant seal. Another object is to provide an improved lubricant seal for a rotating mechanism for preventing leakage of lubricant under the action of centrifugal force. A still further object is to provide, in a rotating mechanism carrying a bearing in which a radially located member is journaled to turn about an axis at substantially right angles to the axis of rotation of the mechanism, an improved lubricant seal for preventing leakage of lubricant from the bearing as the mechanism rapidly revolves. Yet another object is to provide an improved lubricant seal for the bearing of a rotating member of a rotating mechanism wherein the bearing revolves bodily about the axis of rotation of the mechanism for preventing leakage of lubricant under the action of centrifugal force. A still further object is to provide an improved lubricant seal for the bearing of the blade shank of a variable pitch fan. Still another object is to provide an improved lubricant seal for a variable pitch fan for preventing leakage of lubricant from the radially located bearings carried by the fan hub and in which the variable pitch blades are journaled. A further object is to provide an improved lubricant seal embodying a flexible sealing washer secured to the bearing casing and frictionally engaging a radial annular shoulder on the rotatable member journaled in the bearing, so that when the parts are bodily rotated about an axis at right angles to the axis of the rotatable member, the lubricant, due to the action of centrifugal force, will hold the washer tightly in sealing contact with the shoulder to prevent leakage past the bearing. These and other objects and advantages of the invention will, however, hereinafter more fully appear.

In the accompanying drawing there is shown for purposes of illustration one form which the invention may assume in practice.

In this drawing:

Fig. 1 is a fragmentary end view, with parts shown in vertical section, of a variable pitch fan in which a preferred illustrative form of the improved lubricant seal is embodied.

Fig. 2 is an enlarged sectional view taken substantially on line 2—2 of Fig. 1, showing the fan blade bearing with which the seal is associated.

Fig. 3 is a cross-sectional view taken on line 3—3 of Fig. 2.

Fig. 4 is an enlarged fragmentary sectional view taken on the plane of Fig. 2, showing details of the improved seal.

Fig. 5 is a perspective view of the flexible sealing washer.

In this illustrative construction, as shown in the drawing, the improved lubricant seal is embodied in a variable pitch fan generally designated 1, although it will be evident that the seal may be embodied in various forms of rotating mechanisms wherein the same sealing problem is encountered.

The variable pitch fan may assume various forms but is herein generally like that shown in the Adams, Jr., and Troller Patent No. 2,390,068, patented December 4, 1945. There is a cylindrical casing having a circular flow duct section 2 and a centrally located motor-driven shaft 3 to which is secured the hub 4 of a fan. The fan-hub herein includes spaced parallel circular plates 5 and 6, suitably secured to a hub member 7 keyed to the shaft 3. Secured, as by bolts 8, between these plates near their outer peripheries are radially located bearing blocks 9 preferably of rectangular shape, as shown in Fig. 3, and having side projections 10 fitted into transverse grooves 11 on the inner sides of the plates. These bearing blocks have bores 12 arranged with their axes disposed radially with respect to the axis of fan rotation, and positioned in each bore are spaced ball bearings 13, 13 held in spaced relation by a sleeve 14 engaging the adjacent sides of the outer bearing races 15 which may have a pressed fit within the bore 12. Fan blades 16 have shanks 17 journaled in these bearings, and each fan blade has an inwardly facing annular shoulder 18 and a reduced shank portion fitted within the inner bearing races 19; and a nut 20, threaded at 21 on the plate shank, serves to hold the shank in position within the bearings. Surrounding the shank between the inner bearing races is an inner spacing sleeve 22. Attached at 23 to the inner ends of the blade shanks 17 are elements 24 of a variable pitch mechanism whereby the pitch of the fan blades may be varied by turning the blade shanks concurrently in their bearings. This variable pitch mechanism may assume various forms, and since it does not per se enter into the present invention, except to provide some means for turning the blade shanks in their bearings, further description thereof is herein unnecessary. A variable pitch mechanism like that disclosed in the patent above referred to may be employed if desired.

Now referring to the improved lubricant seal for preventing leakage of lubricant from the bearing due to the centrifugal action on the lubricant as the fan rapidly revolves, it will be noted that a flexible sealing washer 25, herein preferably a thin bronze washer, is secured against the outer end wall 26 of the bore 12, and a ring member 27 is arranged between the washer 25 near its outer periphery and the outer, relatively stationary race 15 of the adjacent ball bearings. The washer 25, at its inner periphery 28, surrounds the blade shank 17 and frictionally sealingly engages the shoulder 18 on the blade shank. In lieu of this bronze sealing washer 25, a pair of bronze, or other metal, washers may be respectively secured to the bearing block and blade shank and may have overlapping surfaces to provide the seal. In certain instances, double washers, with felt or other suitable material interposed therebetween, may be employed. Engaging the inner bearing within the bore 12 is a sealing washer 29 of felt or other suitable material, and a thin bronze, or other metal, washer 30 is arranged between this felt washer and the bearing races to keep the felt from working into the bearing.

As the fan rotates, the lubricant for the bearings is subjected to centrifugal force, and without the provision of an adequate seal, lubricant tends to leak out past the blade shanks. In this improved construction, the lubricant, as the fan revolves, is thrown outwardly, exerting a pressure against the inner surface of the flexible sealing washer, holding the latter in tight sealing contact with the annular shoulder on the blade shank, preventing leakage of lubricant from the bearings. The higher the centrifugal forces, the tighter the seal holds, as will be obvious. The narrow annular surfaces on the flexible sealing washer and on the shank shoulder provide an adequate sealing area but present a very small friction area, and, accordingly, will permit easy turning of the blade shank under high centrifugal forces. The retention of the lubricant within the bearings maintains the friction low and also affords long bearing life. The felt washer 29 at the inner side of the bearings is lightly compressed between the inner bearing faces and the nut 20 so that while the pressure is sufficient to retain the lubricant, there is very little friction loss between the parts.

As a result of this invention, an improved lubricant seal for a rotating mechanism is provided wherein leakage of lubricant due to centrifugal action thereon as a result of rapid rotation of the mechanism is substantially prevented. By arranging the flexible sealing washer between the relatively rotating parts and by subjecting the washer to the pressure exerted by the lubricant as a result of centrifugal force, a tight seal is obtained while maintaining friction at a minimum. The seal is simple and durable in construction and is well adapted to the conditions encountered. Other uses and advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In combination, a member mounted to revolve about an axis, a second member carried by said first mentioned member in a position spaced radially from the axis of rotation of said first member and mounted to rotate about an axis at a substantial angle to said first mentioned axis, said first mentioned member having a chamber, bearings for said second mentioned member in said chamber, said chamber containing a lubricant for said bearings, said second mentioned member having an annular sealing surface carried thereby facing towards said first mentioned axis, and a seal for preventing leakage of lubricant from said bearing chamber comprising a flexible annular sealing washer secured at its outer periphery within said bearing chamber and adjacent its inner periphery frictionally engaging with a side surface thereof said sealing surface, said sealing surface and said sealing washer providing a radially outer wall of said chamber and said washer subjected at its surface adjacent said chamber to pressure produced by the centrifugal forces exerted by said lubricant on rotation of said first mentioned member about its axis, whereby said lubricant effects the maintenance of a sealing contact between said sealing washer and said sealing surface.

2. In combination, a member mounted to revolve about an axis, a second member carried by said first mentioned member in a position spaced radially from the axis of rotation of said first member and mounted to rotate about an axis at a substantial angle to said first mentioned axis, said first mentioned member having an annular chamber surrounding a portion of said second member, bearings for said second mentioned member in said chamber, said chamber containing a lubricant for said bearings, said second mentioned member having a shoulder providing an annular sealing surface carried thereby facing towards said first mentioned axis, and a seal for preventing leakage of lubricant from said bearing chamber comprising a flexible annular sealing washer arranged in said bearing chamber and secured at its outer periphery within said chamber and yieldingly engaging adjacent its inner periphery and at its outer surface said sealing surface, said sealing surface and said sealing washer providing a radially outer wall of said chamber and said washer subjected at its inner surface adjacent said chamber to pressure produced by the centrifugal forces exerted by said lubricant on rotation of said first mentioned member about its axis, whereby said lubricant effects the maintenance of a sealing contact between said sealing washer and said sealing surface.

3. In combination, a member mounted to revolve about an axis, a second member carried by said first mentioned member in a position spaced radially from the axis of rotation of said first member and mounted to rotate about an axis at a substantial angle to said first mentioned axis, said second mentioned member having an annular shoulder and said first member being a chamber surrounding a portion of said second mentioned member inwardly of said shoulder, bearings for said second mentioned member in said chamber, said chamber containing a lubricant for said bearings, said shoulder providing an annular sealing surface facing towards said first mentioned axis, and a seal for preventing leakage of lubricant from said bearing chamber comprising a flexible annular sealing washer secured at its outer periphery to said first member and adjacent its inner periphery and at its outer surface yieldingly engaging said sealing surface on said shoulder, said sealing surface and said washer providing a radially outer wall of said chamber and said washer subjected at its inner surface adjacent said chamber to pressure produced by the centrifugal forces exerted by said lubricant on rotation of said first mentioned member about its axis, whereby said lubricant effects the maintenance of a sealing contact between said sealing washer and said sealing surface.

4. In combination, a member mounted to revolve about an axis, a second member carried by said first mentioned member in a position spaced radially from the axis of rotation of said first member and mounted to rotate about an axis at a substantial angle to said first mentioned axis, said first mentioned member having a chamber, bearings for said second mentioned member in said chamber, said chamber containing a lubricant for said bearings, one of said members having an annular sealing surface carried thereby facing towards said first mentioned axis, and a seal for preventing leakage of lubricant from said bearing chamber comprising a flexible annular sealing washer within said chamber secured at one edge to said other member and adjacent its other edge and at its outer surface frictionally engaging said sealing surface, said sealing surface and said washer providing a radially outer wall of said chamber and said washer subjected at its inner surface adjacent said chamber to pressure produced by the centrifugal forces exerted by said lubricant on rotation of said first mentioned member about its axis, whereby said lubricant effects the maintenance of a sealing contact between said sealing washer and said sealing surface.

5. In combination, a member mounted to revolve about an axis, a second member carried by said first mentioned member in a position spaced radially from the axis of rotation of said first member and mounted to rotate about an axis at a substantial angle to said first mentioned axis, said first mentioned member having a chamber, bearings for said second mentioned member in said chamber, said chamber containing a lubricant for said bearings, and a seal for preventing leakage of lubricant from said bearing chamber comprising flexible sealing washer means arranged in said chamber between and engaging said members, said washer means and said members cooperating to provide a radially outer wall of said chamber and said washer means at its inner side providing a surface subjected to pressure produced by the centrifugal forces exerted by said lubricant on rotation of said first mentioned member about its axis, whereby said lubricant effects the maintenance of said washer means in tight sealing relation while permitting relatively free rotation of said second mentioned member on its bearing mounting.

6. In a mechanism in which a member is mounted to revolve about an axis and carries a second member in a position spaced radially from the axis of rotation of the first member and in which the second member is rotatable about an axis at a substantial angle to the first mentioned axis and in which bearings are provided for the second mentioned member housed in a chamber in the first mentioned member, which chamber contains lubricant for said bearings, the improvement which consists of the provision of a sealing surface carried by the second mentioned member and facing towards the first mentioned axis, a flexible annular sealing element secured at one of the peripheries thereof within the chamber and adjacent its other periphery engaging with its own outer surface said sealing surface, said sealing surface and said cooperating sealing element providing a radially outer wall of the chamber, whereby said sealing element is subjected to pressure exerted by the lubricant in said chamber produced by centrifugal force upon rotation of the first member about its axis.

HAROLD F. MINNIS.

REFERENCES CITED

The following references are of record in the file of this patent:

UNITED STATES PATENTS

| Number | Name | Date |
|---|---|---|
| 2,358,310 | Bebinger | Sept. 19, 1944 |